United States Patent [19]

Blank

[11] 3,719,623

[45] March 6, 1973

[54] RUBBERY POLYMERIC MIXTURES COMPRISING A MALEINIZED TYPE OIL

[75] Inventor: Werner Josef Blank, Stamford, Conn.

[73] Assignee: American Cyanamid Company, Stamford, Conn.

[22] Filed: April 1, 1971

[21] Appl. No.: 130,527

[52] U.S. Cl. ......260/23 AR, 117/132 B, 117/132 BF, 117/161 F, 117/161 LN, 260/21, 260/23 S
[51] Int. Cl...........C09d 3/28, C09d 3/74, C09d 5/02
[58] Field of Search.........260/18 CL, 22 R, 23 AR, 260/23 ST, 260/404.8, 23 S

[56] References Cited

UNITED STATES PATENTS

| | | | |
|---|---|---|---|
| 3,253,938 | 5/1966 | Hunt | 260/404.8 |
| 3,300,424 | 1/1967 | Hoenel et al. | 260/22 |
| 3,308,077 | 3/1967 | Pattison et al. | 260/23 |
| 3,366,563 | 1/1968 | Hart et al. | 204/181 |
| 3,369,983 | 2/1968 | Hart et al. | 204/181 |
| 3,428,586 | 2/1969 | Coats | 260/22 |

*Primary Examiner*—Donald E. Czaja
*Assistant Examiner*—Ronald W. Griffin
*Attorney*—Harry H. Kline

[57] ABSTRACT

There is provided a composition of matter comprising a rubbery polymeric mixture of an unsaturated glyceride oil ranging from 30 to 60 percent of the over-all resin solids and a copolymer of: (A) a half ester reaction product of an $\alpha,\beta$-mono-ethylenically unsaturated dibasic acid, or corresponding an-hydride dienophile, and an alcohol containing from four to 22 carbon atoms, said half ester being present in amount ranging from 10 to 55 percent of the over-all resin solids, and (B) a mono-ethylenically unsaturated compound in an amount ranging from 10 to 50 percent of the over-all resin solids.

10 Claims, No Drawings ically unsaturated compound, such as acrylic acid or styrene, present in an amount ranging from 10 to 50 percent, and preferably from 20 to 40 percent, of the over-all resin solids, all percentages being by weight.

RUBBERY POLYMERIC MIXTURES COMPRISING A MALEINIZED TYPE OIL

This invention relates to a resinous composition of substantially white color adapted for use in an electrocoating bath comprising a maleinized type adulterated oil prepared by incorporating an unsaturated glyceride oil with a copolymer of a half ester of maleic anhydride and a straight or branched chained monohydric or polyhydric alcohol containing from four to 22 carbon atoms and a monoethylenically unsaturated compound. More particularly, the invention relates to a resinous composition of substantially white color comprising a maleinized type oil prepared by reacting in the presence of an unsaturated glyceride oil a resinous reaction product of a half ester prepared from maleic anhydride and a straight or branched-chained, monohydric or polyhydric alcohol containing from four to 22 carbon atoms, and mixtures containing same with a monoethylenically unsaturated compound, said unsaturated glyceride oil constituting of from 30 to 60 percent of the resultant resin solids, the maleic anhydride-alcohol half ester constituting of from 10 to 55 percent of the over-all resin solids and the monoethylenically unsaturated compound constituting from 10 to 50 percent of the overall resin solids, all percentages being by weight.

In the past, maleinized type oils have been prepared by reacting unsaturated glyceride oils with an acid or anhydride dienophile such as maleic anhydride which undergo the conventional Diels-Alder reaction. Other acids or anhydride dienophiles have also been included. These are, for instance, acrylic acid, crotonic acid and the like. Unfortunately, such maleinized type oils do not maintain their color in an electrocoating bath. They normally darken markedly. For many applications where whiteness must be maintained, such maleinized type oils cannot be employed. Accordingly, if a maleinized type oil which does not alter or change color in an electro-coating bath could be attained, a long felt need in the art would be satisfied.

Unexpectedly, it has been found that a triglyceride oil can be adulterated or otherwise modified by blending or incorporating therein a resinous reaction product prepared from (A) an $\alpha,\beta$-monoethylenically unsaturated dibasic acid or anhydride, such as by maleic anhydride, and either a monohydric or polyhydric alcohol containing from four to 22 carbon atoms in amounts sufficient to form the half ester of said dibasic acid or anhydride and (B) a monoethylenically unsaturated compound, such as acrylic acid, styrene or mixtures of the same. In this manner, it appears that the color stability of the resultant resinous reaction product is maintained. A color change is not noted because a Diels-Alder reaction, which would affect saturation of the double bond of the maleic anhydride, does not take place with the oil.

To avoid a color change and to maintain bath stability in an electrocoating bath containing the maleinized type oil of the present invention, there is provided a novel method for avoiding the aforementioned Diels-Alder reaction or alpha addition on the dibasic acid or anhydride molecule, such as maleic anhydride. This method requires the use of temperatures sufficient to avoid a Diels-Alder reaction. The temperature will depend on the oil present. Thus, where a highly unsaturated oil is present, as for example tung oil, a low temperature, say about 60°C., must be used, whereas a substantially higher temperature, say about 200°C., can be used where a coconut oil or a low unsaturated oil is employed. In the presence of an alcohol, the maleic acid or anhydride will react to form a half ester of the latter. This ester is then further reacted or copolymerized with a monoethylenically unsaturated compound, such as, for instance, styrene and/or acrylic acid or mixtures thereof. It is a good practice to provide from 30 to 60 percent of an unsaturated glyceride oil and, preferably from 35 to 55 percent, of the over-all resin solids, and a copolymer or resinous reaction product of a maleic anhydride-alcohol monoester present in an amount ranging from 10 to 55 percent, and preferably from 15 to 50 percent, of the over-all resin solids and a monoethylenically unsaturated compound, such as acrylic acid or styrene, present in an amount ranging from 10 to 50 percent, and preferably from 20 to 40 percent, of the over-all resin solids, all percentages being by weight.

Illustrative of the glyceride oils adulterated or otherwise modified herein are: vegetable oils or triglycerides of one or a blend of fatty acids, such as coconut, corn, cottonseed, crambe, linseed, menhaden, mustard, oiticica, olive, palm kernel, peanut, rapeseed, rice bran, safflower oil, sardine, pilchard, sesame, soybean, sunflower, tallow, tung (regular), tung (African), walnut (English). Soybean oil and safflower oil are preferred.

Exemplary of the $\alpha,\beta$-ethylenically unsaturated dibasic acids or anhydrides are: maleic acid, itaconic acid, citraconic acid and mesaconic acid as well as the corresponding anhydrides of such acids. Maleic anhydride is the preferred dibasic acid reactant and will be so exemplified below. As illustrative of the alcohol reactant useful in forming the half ester of the latter acids or anhydrides, there can be mentioned: n-butanol, t-butanol, n-pentanol, sec-pentanol, n-hexanol, 2-ethyl-hexanol, n-dodecanol, tridecyl alcohol, n-octadecanol, octyl phenoxyethanol, nonyl phenoxyethanol and dodecyl phenoxy-ethanol.

Subsequent to half ester formation, the half ester is further reacted or copolymerized as hereinabove mentioned with a monoethylenically unsaturated compound as for instance: styrene, methyl styrene, ethyl styrene, methyl acrylate, methyl methacrylate, acrylonitrile, methacrylonitrile, acrylic acid, methacrylic acid, and equivalents thereof.

The maleinized type adulterated oil compositions of the present invention are generally characterized as sticky, gummy solids, having an acid number ranging from about 50 to about 150 which can be readily blended with an amino-aldehyde cross-linking agent. Illustrative of the latter are either unetherified, partially or fully etherified polymethylolmela-mine or polymethylolguanamine as more fully defined in U.S. Pat. No. 3,471,388. In general, the amino-aldehyde cross-linker and the oil of the present invention are present in a ratio of from 0.1–1 to 1, respectively.

Advantageously, when the compositions of the present invention are used to deposit electrically the coatings of the present invention on electroconductive metallic articles, the compositions may be diluted with water and neutralized generally between pH 6 and 11 with an alkali metal hydroxide or an organic amine to concentrations varying between about 3 and 30 percent and, preferably, between about 7 and 15 percent of the total resin solids. To effect curing of the resinous compositions subsequent to electrodeposition, it is a good practice to employ elevated temperatures usually within the range of about 125°C. and 200°C., and preferably between about 140°C. and about 185°C.

The following examples further illustrate the invention, but are not limitative thereof except as indicated in the appended claims. All parts and percentages are by weight unless otherwise specified.

EXAMPLE 1

Into a suitable reaction vessel equipped with stirrer, nitrogen inlet, and reflux condenser are charged 225 parts of soya bean oil, 75 parts of maleic anhydride, 100 parts of 2-ethyl hexanol and 20 parts of toluene. The mixture is heated with agitation to 150°C. and held for 60 minutes. A blend of 200 parts of styrene, 12.5 parts of acrylic acid and 5 parts of di-t-butyl peroxide is premixed and fed into the heated reactor at a constant rate over a 2 hour period. The temperature is held for an additional two hours and to the reaction mixture is then added 90 parts of n-butanol while cooling to room temperature.

Resultant finished resin recovered from the reaction vessel is found on analysis to have an acid number of 80 and a solids content of 81 percent. The viscosity of the resin which is a sticky, gummy solid is approximately 200 poises and has Gardner color of 1.

EXAMPLE 2

Comparative Example Illustrating Initially

A Diels-Alder Reaction

Into a suitable reaction vessel equipped with stirrer, nitrogen inlet, and reflux condenser are charged 225 parts of soya bean oil and 75 parts of maleic anhydride. The mixture is heated to a temperature of 220°C. for 1 hour. Thereafter the reaction mixture is cooled to 150°C. and a mixture of 100 parts of 2-ethyl hexanol and 20 parts of toluene is added. The mixture is maintained with agitation at 150°C. for 60 minutes. Thereafter, a blend of 200 parts of styrene, 12.5 parts of acrylic acid and 5 parts of di-t-butyl peroxide is premixed and fed into the heated reactor at a constant rate over a 2 hour period. The temperature is held for an additional two hours. Finally, to the reaction mixture is added 90 parts of n-butanol, while cooling the same to room temperature.

Resultant finished resin recovered from the reaction vessel is found on analysis to have an acid number of 80 and a solids content of 81 percent and the viscosity of the resin which is a sticky, gummy solid approximates 200 poises. Significantly, a Gardner color of 8 is observed.

EXAMPLE 3

To a suitable reactor equipped with stirrer, nitrogen inlet and reflux condenser are added 225 parts of soya bean oil, 75 parts of maleic anhydride, 85 parts of 2-ethyl hexanol, 26 parts of nonyl phenoxyethanol and 20 parts of toluene. The mixture is heated for one hour at 150°C. There is next added 20 parts of n-butanol and, thereafter, a charge of 200 parts of styrene, 12.5 parts of acrylic acid and 5 parts of di-t-butyl peroxide is incorporated into the reaction mixture within 1 hour and held at a reaction temperature at 145°C. ± 5°C. during the addition of the charge. The reaction is held at 140°C.–150°C. for an additional 2 hours and then cooled to 130°C. There is added 70 parts of n-butanol with stirring. The contents are removed from the reactor and cooled to room temperature.

On analysis, the resin so prepared has a solids content of 82 percent, and an acid number of 67. Its viscosity at 25°C. is 430 poises and has a Gardner color equal to 1.

EXAMPLE 4

Repeating Example 3 in every material respect except that 200 parts of nonyl phenoxyethanol in lieu of a mixture of 2-ethyl hexanol and nonyl phenoxyethanol are employed, a resin having similar properties as set forth in Example 3 is obtained.

EXAMPLE 5

Comparative Example Illustrating Initially

A Diels-Alder Reaction

To a suitable reactor equipped with stirrer, nitrogen inlet and reflux condenser are added 225 parts of soya bean oil and 75 parts of maleic anhydride. The mixture is heated to a temperature of 220°C. for 1 hour. Thereafter, the mixture is cooled to 150°C. and a mixture of 85 parts of 2-ethyl hexanol, 26 parts of nonyl phenoxyethanol and 20 parts of toluene is added. The temperature of the mixture is maintained with agitation for 1 hour at 150°C. There is next added 20 parts of n-butanol and, thereafter, a blend of 200 parts of styrene, 12.5 parts of acrylic acid and 5 parts of di-t-butyl peroxide is premixed and incorporated into the reaction mixture within 1 hour and held at a reaction temperature at 145°C. ± 5°C. during the addition of the charge. The reaction is held at 140°C.–150°C. for an additional 2 hours and then cooled to 130°C. There is added 70 parts of n-butanol with stirring. The contents are removed from the reactor and cooled to room temperature.

On analysis, the resin so prepared has a solids content of 82 percent, and and acid number of 67. Its viscosity at 25°C. is 430 poises. Significantly, however, it has a Gardner color equal to 9.

EXAMPLE 6

Repeating the procedure of Example 3 in every detail except that safflower oil is substituted for the soya bean oil, there is obtained, as in Example 3 above, a similar resin with respect to viscosity, acid number and color.

EXAMPLE 7

This example illustrates the utilization of the resin prepared in Example 1 above.

Seventy-six parts of the resin defined in Example 1 above are blended with 15.5 parts of a tetra(ethoxymethyl)di(methoxy-methyl)melamine cross-linking agent, 5.7 parts of diisopropanolamine and 23.0 parts of a titanium dioxide rutile pigment. Resultant paste is ground on a three roll mill and emulsified in 870 parts of deionized water. The emulsified mixture was aged for 24 hours and then introduced into a bath container containing a stainless steel cathode electrode and a zinc-phosphated steel anode electrode.

Varying potentials ranging from 200 to 300 volts per minute were applied across the electrodes to electrocoat the anode. After rinsing with deionized water and baking for 20 minutes at 350°F., the data obtained are tabularized in Table I below:

TABLE I

| Deposition voltage (per minute) | Film Thickness mils | Knoop Hardness | Impact (in./lb.) |
|---|---|---|---|
| 200 | 0.7 | 6.8 | 50 |
| 250 | 0.9 | 5.7 | 60 |
| 300 | 1.1 | 5.2 | 50 |

Baths aged at room temperature for more than a month exhibit good stability and no alternation in the deposition properties.

The films, moreover, exhibit a very glossy appearance and show a high degree of whiteness.

EXAMPLE 8

The procedure of Example 7 is repeated in every detail except that the resin prepared in accordance with Example 2 is employed in the electrocoating bath. After baking, it is noted that a low degree of whiteness is observed.

I claim:

1. A resinous composition of matter comprising: a rubbery, polymeric mixture of an unsaturated glyceride oil ranging from 30 to 60 percent of the overall resin solids and a copolymer of (A) a half ester reaction product of an $\alpha,\beta$-monoethylenically unsaturated dibasic acid or corresponding anhydride dienophile and a monohydric alcohol free of nonbenzenoid unsaturation containing from about four to about 22 carbon atoms, said half ester being present in an amount ranging from 10 to 55 percent of the over-all resin solids, and (B) a monoethylenically unsaturated compound selected from the group consisting of styrene, methyl styrene, ethyl styrene, methyl acrylate, methyl methacrylate, acrylonitrile, methacrylonitrile, acrylic acid, and methacrylic acid ranging from 10 to 50 percent of the resin solids.

2. The composition according to claim 1 wherein the unsaturated glyceride oil is soya bean oil.

3. The composition according to claim 1 wherein the unsaturated glyceride oil is safflower oil.

4. The composition according to claim 1 wherein the anhydride dienophile is maleic anhydride.

5. The composition according to claim 1 wherein the alcohol is 2-ethyl hexanol.

6. A process for the preparation of the resinous, rubbery, polymeric composition according to claim 1 wherein the unsaturated glyceride oil is heated with an $\alpha,\beta$-monoethylenically unsaturated dibasic acid or corresponding anhydride dienophile and a monohydric alcohol free of nonbenzenoid unsaturation containing from four to 22 carbon atoms at a temperature insufficient to effect a Diels-Alder reaction, ranging from about 60°C. to about 200°C., forming substantially in situ the half ester of the dibasic acid component, copolymerizing said half ester with a monoethylenically unsaturated compound selected from the group consisting of styrene, methyl styrene, ethyl styrene, methyl acrylate, methyl methacrylate, acrylonitrile, methacrylonitrile, acrylic acid, and methacrylic acid or mixtures of said compound and recovering said resinous composition, wherein the amount of said oil, half ester, and monoethylenically unsaturated compound being 30–60 percent, 10–55 percent, and 10–50 percent, respectively, of the overall solids content.

7. The process according to claim 6 wherein the unsaturated glyceride is soya bean oil.

8. The process according to claim 6 wherein the unsaturated glyceride is safflower oil.

9. The process according to claim 6 wherein the anhydride dienophile is maleic anhydride.

10. The process according to claim 6 wherein the alcohol is 2-ethyl hexanol.

* * * * *